(12) United States Patent
Burstein et al.

(10) Patent No.: US 10,324,513 B2
(45) Date of Patent: Jun. 18, 2019

(54) CONTROL OF PERIPHERAL DEVICE DATA EXCHANGE BASED ON CPU POWER STATE

(71) Applicant: MELLANOX TECHNOLOGIES LTD., Yokneam (IL)

(72) Inventors: Idan Burstein, Karmiel (IL); Shlomo Raikin, Kibbutz Yassur (IL); Noam Bloch, Bat Shlomo (IL); Lavi Koch, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 60 days.

(21) Appl. No.: 14/836,988

(22) Filed: Aug. 27, 2015

(65) Prior Publication Data

US 2016/0062442 A1 Mar. 3, 2016

Related U.S. Application Data

(60) Provisional application No. 62/044,260, filed on Aug. 31, 2014.

(51) Int. Cl.
| | |
|---|---|
| *G06F 1/00* | (2006.01) |
| *G06F 1/26* | (2006.01) |
| *G06F 1/32* | (2019.01) |
| *G06F 1/3209* | (2019.01) |
| *G06F 1/324* | (2019.01) |
| *H04L 12/10* | (2006.01) |

(52) U.S. Cl.
CPC ............ *G06F 1/3209* (2013.01); *G06F 1/266* (2013.01); *G06F 1/324* (2013.01); *H04L 12/10* (2013.01); *Y02D 10/126* (2018.01); *Y02D 50/20* (2018.01)

(58) Field of Classification Search
CPC ........................................................ G06F 1/32
See application file for complete search history.

(56) References Cited

U.S. PATENT DOCUMENTS

| | | | |
|---|---|---|---|
| 7,272,741 B2 | 9/2007 | Wilcox et al. | |
| 8,010,822 B2 | 8/2011 | Marshall et al. | |
| 8,566,628 B2 | 10/2013 | Branover et al. | |
| 8,949,498 B2 | 2/2015 | Kagan | |
| 9,154,312 B2 * | 10/2015 | Katar | ...................... H04L 12/12 |
| 9,374,190 B2 * | 6/2016 | Koskela | .................... H04L 1/00 |
| 2003/0110012 A1 | 6/2003 | Orenstien et al. | |

(Continued)

OTHER PUBLICATIONS

Hewlett-Packard Corporation et al., "Advanced Configuration and Power Interface Specification", Version 5.0 Errata A, 956 pages, Nov. 13, 2013.

(Continued)

*Primary Examiner* — Mohammed H Rehman
(74) *Attorney, Agent, or Firm* — Kligler & Associates (57) ABSTRACT

A method for processing data includes receiving in a peripheral device, which is connected by a bus to a host processor having host resources, a notification of a sleep state of at least one of the host resources. While the at least one of the host resources is in the sleep state, when the peripheral device receives data from a data source for delivery to the host processor, the peripheral device sends a message to the data source, which causes the data source to defer conveying further data to the peripheral device until the at least one of the host resources has awakened from the sleep state.

27 Claims, 3 Drawing Sheets

(56) References Cited

U.S. PATENT DOCUMENTS

| | | | |
|---|---|---|---|
| 2007/0238437 A1* | 10/2007 | Jaakkola | H04W 52/0251 455/343.1 |
| 2007/0245164 A1 | 10/2007 | Mitarai | |
| 2009/0299506 A1* | 12/2009 | Lydon | G11B 19/027 700/94 |
| 2010/0131781 A1 | 5/2010 | Memon et al. | |
| 2010/0332869 A1 | 12/2010 | Hsin et al. | |
| 2011/0289357 A1* | 11/2011 | Shiina | G06F 11/3636 714/38.1 |
| 2012/0014245 A1* | 1/2012 | Park | H04L 1/1832 370/216 |
| 2012/0117403 A1 | 5/2012 | Bieswanger et al. | |
| 2012/0213118 A1 | 8/2012 | Lindsay et al. | |
| 2012/0324258 A1 | 12/2012 | Branover et al. | |
| 2013/0157707 A1* | 6/2013 | Hsiao | H04W 52/0206 455/517 |
| 2013/0250853 A1* | 9/2013 | Eravelli | H04L 69/163 370/328 |
| 2014/0013057 A1* | 1/2014 | Agrawal | G06F 12/0875 711/126 |
| 2014/0153568 A1 | 6/2014 | Gasparakis | |
| 2014/0181228 A1* | 6/2014 | Cho | H04L 67/1095 709/206 |
| 2014/0181352 A1 | 6/2014 | Conrad et al. | |
| 2014/0201411 A1 | 7/2014 | Kumar et al. | |
| 2014/0237278 A1* | 8/2014 | Kumar | G06F 1/3206 713/323 |
| 2014/0281639 A1 | 9/2014 | Wagh et al. | |
| 2014/0304538 A1* | 10/2014 | Chen | G06F 1/3234 713/323 |
| 2014/0362707 A1* | 12/2014 | Frederiksen | H04L 1/1621 370/241 |
| 2015/0138988 A1* | 5/2015 | Shaw | H04L 41/5025 370/241 |
| 2015/0208029 A1* | 7/2015 | Gluskin | H04N 7/141 348/14.03 |
| 2015/0271176 A1* | 9/2015 | Wei | H04W 52/0209 455/411 |
| 2015/0378945 A1* | 12/2015 | Bradbury | G06F 9/467 710/264 |
| 2016/0380898 A1* | 12/2016 | Englund | H04L 47/14 370/235 |

OTHER PUBLICATIONS

PCI Express® Base Specification, Revision 3.1, 1073 pages, Mar. 2014.

Infiniband Trade Association, "InfiniBandTM Architecture Specification vol. 1", Release 1.2.1, Nov. 2007.

Burstein et at., U.S. Appl. No. 14/745,549 filed Jun. 22, 2015.

U.S. Appl. No. 14/745,549 Office Action dated Oct. 3, 2016.

U.S. Appl. No. 14/745,549 Office Action dated May 18, 2017.

U.S. Appl. No. 14/745,549 Office Action dated Jan. 9, 2018.

* cited by examiner

CONTROL OF PERIPHERAL DEVICE DATA EXCHANGE BASED ON CPU POWER STATE

CROSS-REFERENCE TO RELATED APPLICATION

This application claims the benefit of U.S. Provisional Patent Application 62/044,260, filed Aug. 31, 2014, which is incorporated herein by reference.

FIELD OF THE INVENTION

The present invention relates generally to computer systems, and particularly to methods and devices for power management in such systems.

BACKGROUND

Large-scale and high-power computer systems consume great amounts of electrical power, and reducing this power consumption has become a key concern in system design. Various architectural features and interfaces have been developed to facilitate control and reduction of power consumption.

For example, the Advanced Configuration and Power Interface (ACPI) Specification (November, 2013) was developed by leading companies in the computer industry in order to establish common interfaces enabling robust operating system (OS)-directed motherboard device configuration and power management of both devices and entire systems. The ACPI Specification defines both global power states of the computer and specific power states of components, such as the processor (generally referred to as the central processing unit, or CPU). The processor states are referred to as C0, C1, C2, . . . , Cn, wherein C0 is an active power state in which the CPU executes instructions, and C1 through Cn refer to different sleeping states (also referred to as sleep levels), with progressively lower levels of power consumption and correspondingly greater exit latencies. To conserve power, the OS places the processor into one of the supported sleeping states when the processor is idle. To regulate power consumption of active processors in the C0 state, the ACPI Specification also defines means for processor clock throttling and different processor performance states P0, P1, . . . Pn.

The PCI Express® Base Specification (Revision 3.1, March, 2014) defines mechanisms that can be used on the PCI Express (PCIe) bus to coordinate power management with Endpoints on the bus. For example, section 6.18 of the specification describes a Latency Tolerance Reporting (LTR) mechanism, which enables Endpoints to report their service latency requirements for Memory Reads and Writes to the Root Complex, so that power management policies for central platform resources can be implemented to consider Endpoint service requirements. (The Root Complex is not required to honor the requested service latencies, but is strongly encouraged to do so.)

As another example, section 6.19 in the PCIe specification describes an Optimized Buffer Flush/Fill (OBFF) Mechanism, which enables a Root Complex to report to Endpoints time windows when the incremental platform power cost for Endpoint bus mastering and/or interrupt activity is relatively low. Typically these windows correspond to times during which the host CPU(s), memory, and other central resources associated with the Root Complex are active to service some other activity, for example the operating system timer tick. An OBFF indication is a hint—Functions are still permitted to initiate bus mastering and/or interrupt traffic whenever enabled to do so, although this activity will not be optimal for platform power, and the specification suggests that it should be avoided.

A number of techniques have been described in the patent literature for power management involving input/output (I/O) components. For example, U.S. Patent Application Publication 2012/0324258 describes a method of regulating power states in a processing system in which a processor component reports a present processor power state to an input-output hub. The present processor power state corresponds to one of a plurality of different processor power states ranging from an active state to an inactive state. The input-output hub receives data indicative of the present processor power state and establishes a lowest allowable hub power state that corresponds to one of a plurality of different hub power states ranging from an active state to an inactive state.

SUMMARY

Embodiments of the present invention that are described hereinbelow provide techniques that can be implemented by peripheral devices to enhance system performance when low-power states are used.

There is therefore provided, in accordance with an embodiment of the invention, a method for processing data, which includes receiving in a peripheral device, which is connected by a bus to a host processor having host resources, a notification of a sleep state of at least one of the host resources. While the at least one of the host resources is in the sleep state, the peripheral device receives data from a data source for delivery to the host processor. Responsively to the notification and the received data, the peripheral device sends a message to the data source, which causes the data source to defer conveying further data to the peripheral device until the at least one of the host resources has awakened from the sleep state.

In some embodiments, the peripheral device includes a network interface controller (NIC), which couples the host processor to a network, and receiving the data includes receiving at the NIC a data packet transmitted over the network. In some of these embodiments, sending the message includes sending a negative acknowledgment (NAK) over the network to the data source, which instructs the data source to retransmit the data packet. In one embodiment, the notification includes an indication of a projected sleep period of the host processor, and sending the NAK includes instructing the data source to retransmit the data packet at a conclusion of the sleep period.

Additionally or alternatively, the method includes sending a notification from the NIC to the data source when the at least one of the host resources awakens from the sleep state, which instructs the data source to retransmit the data packet. In one embodiment, the at least one of the host resources includes a host memory, in which the host processor, before entering the sleep state, posted buffers to which the NIC is to write the data, and sending the notification includes, when the host memory awakens while the host processor remains in the sleep state, requesting transmission from the data source of a quantity of the data corresponding to a volume of the posted buffers.

In another embodiment, sending the message includes sending a response over the network to the data source, containing a response parameter that causes the data source to reduce a rate of transmission of the further data. Additionally or alternatively, sending the message includes sending a congestion notification packet to the data source.

In some embodiments, the method includes conveying an interrupt from the peripheral device in response to receiving the data, in order to wake the host processor from the sleep state. In a disclosed embodiment, receiving the notification includes receiving an indication of a projected sleep period of the host processor, and conveying the interrupt includes delaying conveyance of the interrupt until a conclusion of the sleep period.

In a disclosed embodiment, the host resources include a host memory, in which in which the host processor, before entering the sleep state, posted buffers to which the peripheral device is to write the data, and sending the message includes, when the host memory is awake while the host processor remains in the sleep state, requesting transmission from the data source of a quantity of the data corresponding to a volume of the posted buffers.

There is also provided, in accordance with an embodiment of the invention, apparatus for processing data, including a host interface, which is configured to be connected by a bus to a host processor having multiple host resources, and a network interface, which is configured to transmit and receive data over a network. Packet processing circuitry is coupled between the host interface and the network interface, and is configured to receive, via the host interface, a notification of a sleep state of at least one of the host resources, and while the at least one of the host resources is in the sleep state, to receive data from a data source via the network interface for delivery to the host processor, and responsively to the notification and the received data, to send a message to the data source over the network, which causes the data source to defer conveying further data to the apparatus until the at least one of the host resources has awakened from the sleep state.

The present invention will be more fully understood from the following detailed description of the embodiments thereof, taken together with the drawings in which:

DETAILED DESCRIPTION OF EMBODIMENTS

U.S. patent application Ser. No. 14,745,549, filed Jun. 22, 2015, which is assigned to the assignee of the present patent application and whose disclosure is incorporated herein by reference, describes techniques that can be implemented in peripheral components in order to cooperate with the host processor (also referred to as the CPU) in reducing system power consumption. The peripheral component in question, such as a network interface controller (NIC), receives power state information from the host processor. The peripheral component uses this information, for example, in selectively directing data and interrupts to those host resources that are in active power states, thus enabling sleeping resources to remain asleep for as long as possible. (The term "host resources," in the context of the present description and in the claims, includes the individual cores of the CPU, as well as other components that are associated with the CPU, such as the memory and root complex.) Additionally or alternatively, when data and/or interrupts must be sent to a core that is currently sleeping, the peripheral device may choose to buffer the data and/or moderate (hold off) the interrupts selectively for that core, in order to optimize the balance between maximizing sleep time and maintaining tolerable processing latency.

On the other hand, if packet traffic continues to arrive at the NIC while the host processor and/or other host resources are in a sleep state (and particularly a deep sleep state, with long wakeup latency), the NIC will need to maintain a large buffer to hold the incoming traffic until the host processor wakes up. The memory required for this sort of buffering can be expensive, and long-term buffering may not be practical. The alternative, however, is to discard the incoming traffic, which has its own costs in terms of wasted network bandwidth and reduced system performance.

Embodiments of the present invention that are described herein address this problem by enabling a peripheral device, such as a NIC, to hold off network traffic or other input data that is directed to a sleeping host resource, based on notifications that the peripheral device receives regarding such sleep states. When the peripheral device receives data from a data source for delivery to or via the host resource in question while the host resource is in a sleep state, the peripheral device autonomously sends a message back to the data source. This message is formulated, based upon the communication protocol used by the data source, in such a way as to cause the data source to defer conveying further data to the peripheral device until the host resource has awakened from the sleep state. In this manner, data loss and wasted transmission bandwidth can be minimized while accommodating sleep states of the host resources.

For the sake of clarity and concreteness, the description that follows relates mainly to sleep states of the host processor. The principles of the present invention and the techniques and apparatus described herein, however, are similarly applicable, mutatis mutandis, to handling sleep states of other host resources.

Typically, upon receiving the data, the peripheral device conveys an interrupt to the host processor in order to wake the host processor from its sleep state. In some cases, however, the peripheral device will delay waking the host processor for a certain period of time, in order to prolong the sleep state and thus save power. In some cases, notifications from the host processor to the peripheral device may indicate the projected duration of a sleep period that the host processor is about to begin. In such cases, the peripheral device may delay conveying the interrupt to the host processor at least until the projected conclusion of the sleep period.

The disclosed embodiments relate specifically to a NIC, which receives data packets transmitted over the network to the host processor. In some embodiments, the NIC sends a negative acknowledgment (NAK) over the network to the data source, which instructs the data source to retransmit the data packet, and thus defers transmission of further packets from the data source. In some network protocols (such as InfiniBand), the NIC can transmit a "receiver-not-ready" RNR NAK packet, which also indicates to the sender a certain length of time to wait before retransmitting. When the host processor indicates to the NIC the desired duration of its projected sleep period, the NIC may set the waiting time in the NAK message so that the data source retransmits the data packet only at the conclusion of the sleep period.

Additionally or alternatively, when the host processor actually awakens from the sleep state, the NIC may send a notification to the data source, which instructs the data source to retransmit the data packet.

Additionally or alternatively, the response returned over the network from the NIC to the data source may contain a response parameter that causes the data source to reduce the rate of transmission of further data that it transmits. This feature is useful particularly (although not exclusively) in connection with protocols, such as the Transmission Control Protocol (TCP), that allow the receiver to control the transmission bandwidth of the transmitter.

The embodiments described herein may advantageously be used in combination with the techniques described in the above-mentioned U.S. patent application Ser. No. 14/745,549, and may be implemented in the same NIC or other peripheral device. Alternatively, the present embodiments may be implemented independently, as stand-alone features of a suitable NIC or other peripheral device.

Figure 1:
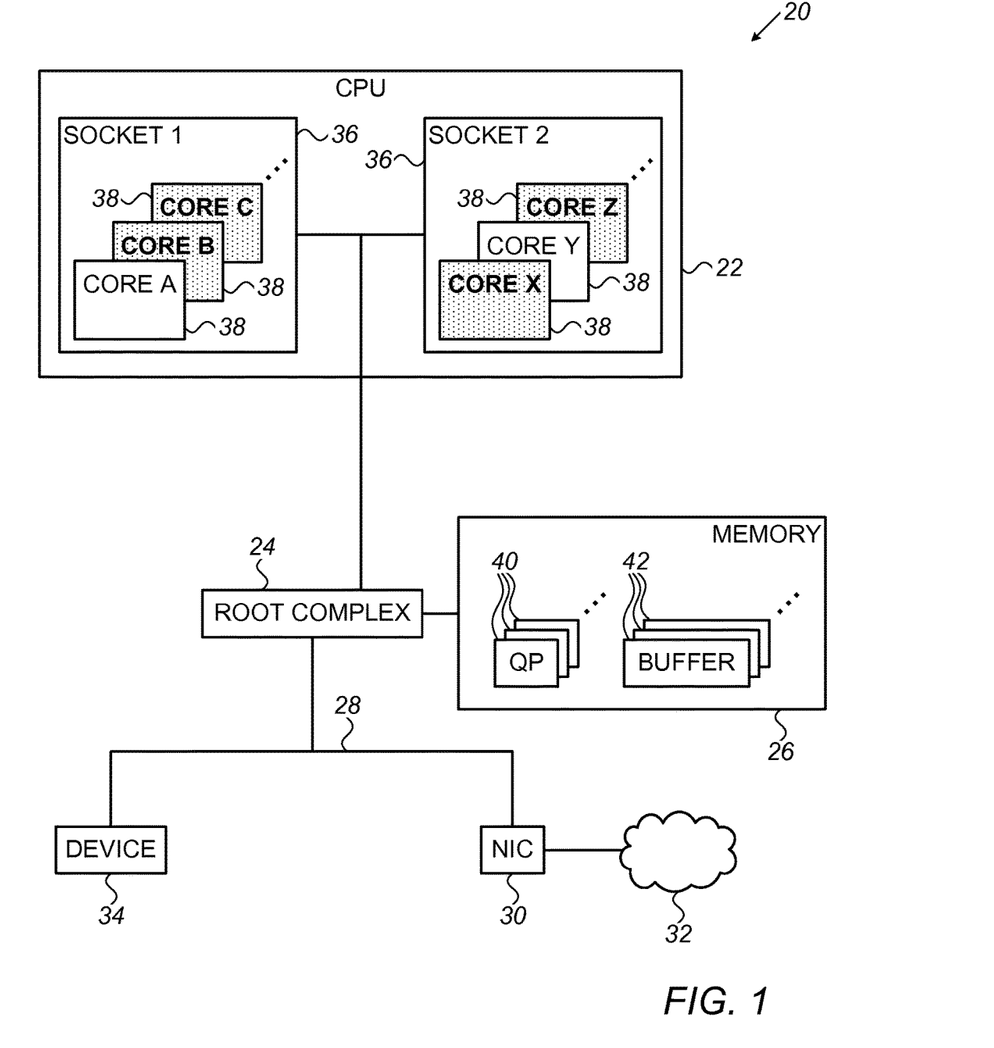
FIG. 1 is block diagram that schematically illustrates a computer system, in accordance with an embodiment of the invention.

FIG. 1 is a block diagram that schematically illustrates a computer system 20, in accordance with an embodiment of the invention. System 20 comprises host resources, including a CPU 22 (also referred to as the host processor), as well as a root complex 24 and a host memory 26, which are typically interconnected by internal host buses. (Although root complex 24 is shown in the figure as a separate component from CPU 22, in some implementations the root complex functionality is integrated into the CPU.) The host resources are connected by a peripheral interface bus 28, such as a PCIe bus, to peripheral components, such as a NIC 30 and other peripheral devices 34. NIC 30 connects system 20 to a packet network 32, such as an Ethernet or InfiniBand switch fabric.

As in common server architectures, CPU 22 comprises multiple sockets 36 in the host motherboard, each of which accommodates multiple cores 38. Typically, at any given time, CPU 22 can assume various processor power states, including an active state and a number of sleep states of varying depth. Typically, when CPU 22 is active, some of cores 38 are active, while others are in various core sleep states. (Alternatively, at times of high load, all of the cores may be active.) For example, in the pictured example, cores A and Y are active, while cores B, C, X and Z are in sleep states, as indicated by the shading in the figure. The other host resources, such as root complex 24 and memory 26, may similarly have multiple different power states.

Figure 2:
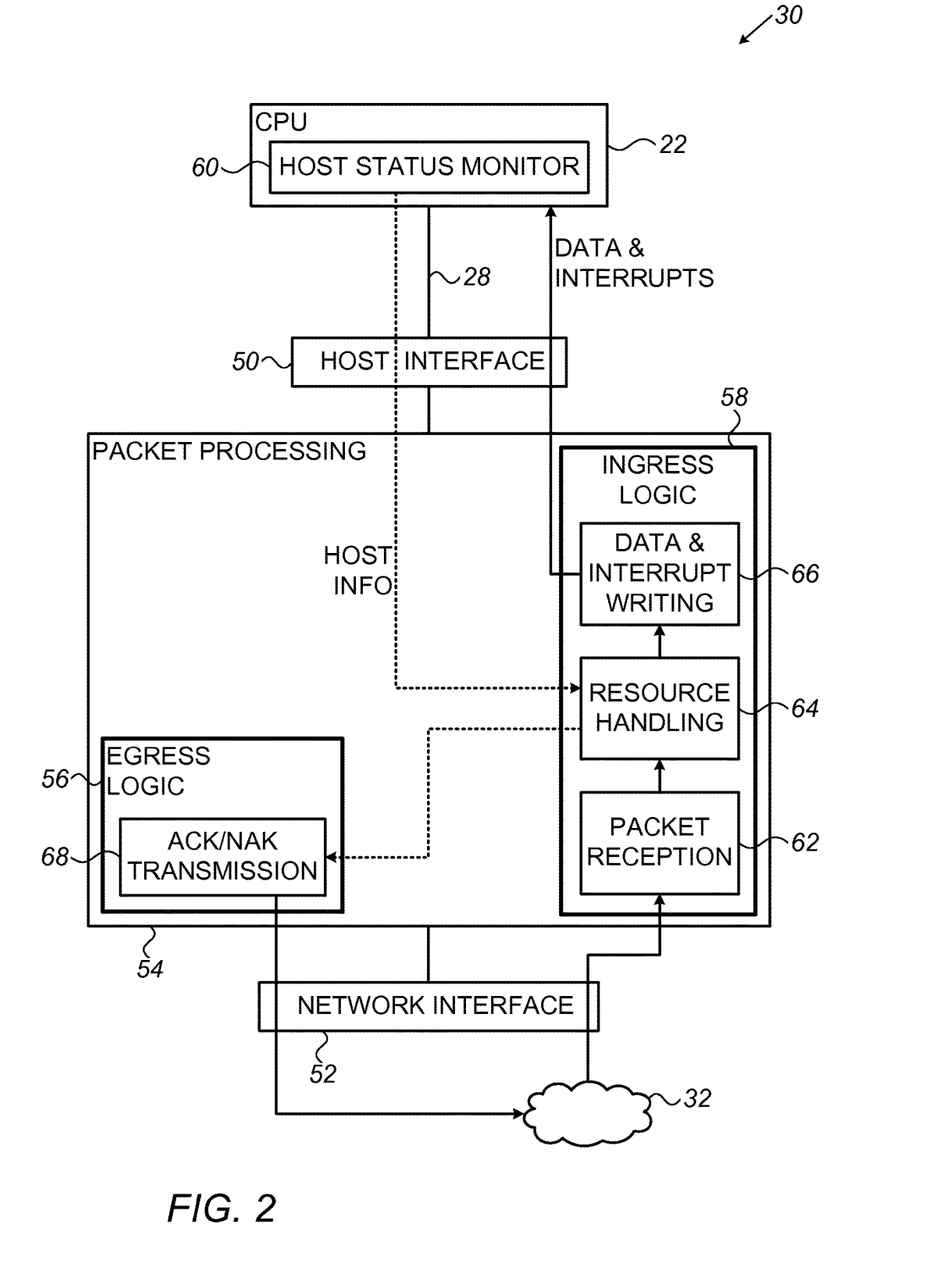
FIG. 2 is a block diagram that schematically shows elements of a network interface controller (NIC), in accordance with an embodiment of the invention.

A power management component of system 20, such as an operating system (OS) power management process running on CPU 22 (as shown in FIG. 2) or a dedicated hardware component, tracks and controls the power states of the CPU as a whole, cores 38, and other host resources, and passes information regarding the respective power states of the host resources to NIC 30 and other peripheral devices 34. As noted earlier, this power state information typically includes indications of the current or projected processor sleep state of CPU 22, and possibly the expected or desired duration of sleep before the CPU is to awaken. Additionally or alternatively, the power state information indicates activity and sleep states of each of cores 38 and other resources.

The power management component that is associated with CPU 22 may pass this power state information to NIC 30 and other peripheral devices 34 in various forms (including "raw" information and/or instructions relating to interrupt moderation, as well as data steering) and via various channels. For example, in some embodiments, the power management component passes the information in the form of in-band messages, such as dedicated PCIe packets, over bus 28. The OBFF mechanism described above in the Background section may be used and extended, as necessary, to support this sort of fine-grained power state reporting. In other embodiments, a dedicated hardware channel on bus 28 (or separate from bus 28) may be provided for transmission of power state information.

Inter-process communications between system 20 and other computers over network 32 use multiple transport service instances, referred to herein as queue pairs (QPs) 40, in accordance with InfiniBand convention. (Alternatively, in Ethernet parlance, transport service instances may be referred to as rings.) Typically, the context for each QP 40 is held in memory 26, where it can be accessed by NIC 30 and by software running on CPU 22. NIC 30 and software processes running on CPU 22 exchange data by writing to and reading from buffers 42 in memory 26.

FIG. 2 is a block diagram that schematically shows details of NIC 30, in accordance with an embodiment of the invention. NIC 30 is connected to bus 28 by a host interface 50, such as a PCIe interface, and to network 32 by a network interface 52, such as an InfiniBand or Ethernet interface with one or more ports. Packet processing circuitry 54 is coupled between host interface 50 and network interface 52 and includes egress logic 56, for generating and transmitting outgoing packets to network 32, and ingress logic 58, for receiving packets from network 32 and delivering the packet contents to the appropriate processes running on CPU 22. For the sake of brevity, the present disclosure will focus mainly on certain functions of ingress logic 58, and specifically how these functions are controlled so as control transmission of packets from sources on network 32 to NIC 30 based on the power state information provided by CPU 22. The integration of these power-related functions with the general design and functionality of egress logic 56 and ingress logic 58 of existing NICs will be apparent to those skilled in the art after reading the present description.

In the pictured embodiment, a host status monitor 60, for example a driver software component running on CPU 22, passes notifications regarding respective power states of the host resources to NIC 30, and possibly also to other peripheral devices. Alternatively or additionally, such power state information may be provided by a suitable logic component (not shown in the figures) within NIC 30, on the basis of raw information received from host resources.

Ingress logic 58 in NIC 30 uses the power state information in deciding how to handle incoming data packets from network 32. Specifically, upon receiving a packet from network 32, packet reception logic 62 processes the packet header in order to identify the QP 40 to which the packet belongs and thus to identify the process on CPU 22 to which the data payload of the packet is to be delivered. Resource handling logic 64 identifies the status of the host resources that can be used in receiving and processing the data, based on information provided by status monitor 60, and decides on this basis how to handle the incoming packet. The above-mentioned U.S. patent application Ser. No. 14,745,549 describes, inter alia, methods and considerations that can be applied by logic 64 in choosing the resources to be used for this purpose, for example, deciding which core 38 should receive an interrupt. The present embodiments, as explained above, relate to techniques for deferring incoming traffic during sleep states of CPU 22. Further details of these techniques are presented hereinbelow with reference to FIG. 3.

Based on the resource handling decisions made by logic 64, a scatter engine 66 in ingress logic 58 writes the data from incoming packets to an appropriate buffer in memory 42 and sends an interrupt over bus 28 to the core 38 that is to receive and process the data. The actions of scatter engine 66 regarding data delivery and interrupt moderation are likewise affected by power state information provided by monitor 60, specifically depending upon whether the resources selected to receive the data are currently active or in a sleep state.

Upon receipt of an incoming packet, resource handling logic 64 invokes an acknowledgment generator 68 to transmit a response over network 32 to the source of the packet. The form and content of the acknowledgment (ACK) or negative acknowledgment (NAK) are dictated by the applicable transport protocol, such as InfiniBand or TCP, as is known in the art. Logic 64 takes advantage of the protocol, however, to control network traffic in accordance with sleep states of CPU 22.

Figure 3:
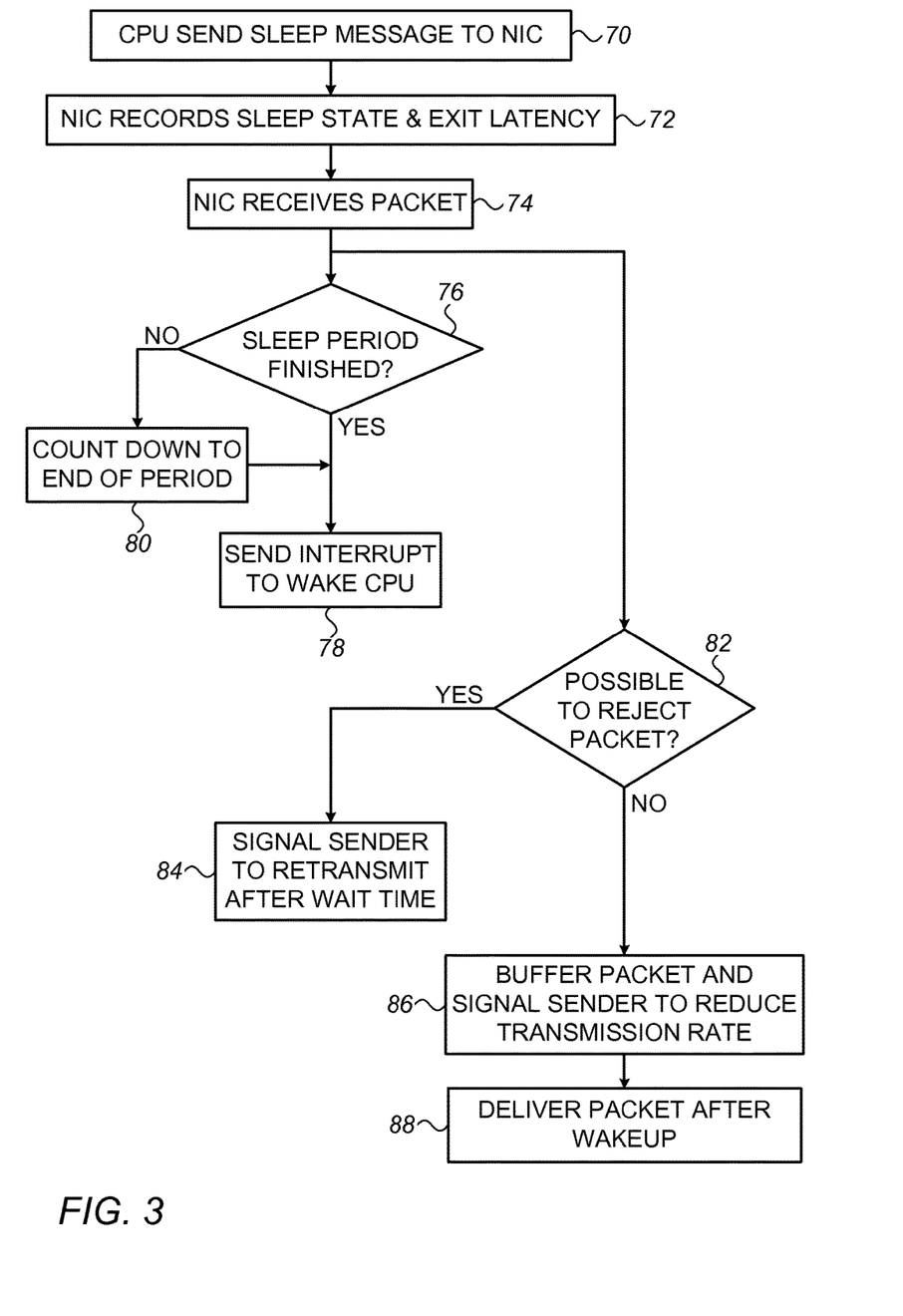
FIG. 3 is a flow chart that schematically illustrates a method for handling of incoming packets by a NIC, in accordance with an embodiment of the invention.

FIG. 3 is a flow chart that schematically illustrates a method for handling of incoming packets from network 32 by NIC 30, in accordance with an embodiment of the invention. The method uses power state information regarding host sleep states, which is provided asynchronously by host status monitor 60, as noted above. The method is described hereinbelow, for the sake of clarity and concreteness, with reference to elements of the specific host and NIC architecture that is illustrated in FIGS. 1 and 2. The principles of this embodiment, however, may alternatively be implemented, mutatis mutandis, in suitable NICs and systems of other types, and such alternative implementations are considered to be within the scope of the present invention.

The method of FIG. 3 is invoked when CPU 22 sends a notification to NIC 30 (such as a message from host status monitor 60) that the CPU is about to enter a sleep state, at a sleep notification step 70. The notification typically indicates the level of the sleep state, i.e., how deeply the CPU is going to sleep, and can also include a projected sleep period, indicating the minimum length of time that should pass before the CPU is reawakened. The decision criteria as to the timing, depth and duration of sleep are part of the power management strategy in system and are beyond the scope of the present disclosure. Resource handling logic 64 in NIC 30 receives the notification and records the sleep state, at a sleep recording step 72. Depending on the depth of the sleep state, logic 64 is also able to estimate and record the exit latency from the sleep state, i.e., how long it will take the CPU to return to full activity after receiving an interrupt from NIC 30. If the notification at step 70 indicates a projected sleep period, logic 64 sets a timer to indicate when the sleep period will end.

Ingress logic 58 receives a packet from network 32 while CPU 22 is sleeping, at a packet reception step 74. Before notifying CPU 22 that the packet has arrived, resource handling logic 64 checks whether it is possible to wake the CPU immediately, at a sleep period checking step 76. For example, if the notification at step 70 indicated a projected sleep period, logic 64 will check whether the timer set at step 72 to monitor the sleep period has expired. Additionally or alternatively, for certain types of packets (as indicated by the source address or other header fields), logic 64 may be configured to wake the CPU regardless of timer status. If there is no timer pending at step 76, or the timer is to be disregarded, logic 64 immediately instructs scatter engine 66 to convey an interrupt in order to wake CPU 22, at an interrupt transmission step 78. Otherwise, logic 64 waits for the timer to count down to the end of the projected sleep period, at a countdown step 80, before waking the CPU at step 78.

Even when CPU 22 is to be awakened immediately via steps 76 and 78, a substantial volume of data can arrive from network 32 before the CPU is ready to handle the data. Buffering all of this data can put a strain on the resources of NIC 30 and lead to packet loss in the case of buffer overflow. Therefore, upon receiving a packet at step 74 while CPU 22 is sleeping, resource handling logic 64 instructs acknowledgment generator 68 to respond to the source of the packet in such a way as to cause the source to defer further transmissions until CPU has awakened.

The mode of response by acknowledgment generator 68 depends on whether the applicable protocol allows NIC 30 to actively reject the packet, as determined at a rejection checking step 82. For example, the InfiniBand transport protocol enables the receiver of a packet sent over a reliable connection to respond with an RNR-NAK packet, which instructs the sender to retransmit the packet in question (as identified by the packet serial number) after first waiting for a certain hold-off period. Thus, if permitted by the protocol, acknowledgment generator 68 responds to the source of the packet with an RNR-NAK or equivalent retransmit instruction, at a NAK step 84. The hold-off period indicated by the NAK packet is typically equal at least to the wakeup latency of CPU 22, and may be extended to include the time remaining in the projected sleep period of the CPU, so that the data source will retransmit the packet only at the conclusion of the sleep period.

Additionally or alternatively, after rejecting the packet, resource handling logic 64 may wait until CPU 22 awakens from the currently sleep state, and may then instruct egress logic 56 to send a notification to the source of the packet to retransmit the data packet immediately. In InfiniBand networks, for example, the notification may be in the form of an out-of-sequence NAK packet transmitted by acknowledgment generator 68. This retransmission notification may be invoked by an explicit indication by CPU 22 that it has reawakened. Additionally or alternatively, resource handling logic 64 may determine that the CPU has awakened and send the retransmission notification at the conclusion of the relevant sleep timer and/or latency period, as explained above.

Alternatively, when it is not possible to reject the packet received at step 74, resource handling logic 64 instructs scatter engine 66 to buffer the packet, for example in memory 26, at a packet buffering step 86. In this case, logic 64 instructs acknowledgment generator 68 to send a response over network 32 to the data source, containing a response parameter that causes the data source to reduce the rate of transmission of further packets. For example, in a TCP acknowledgment, generator 68 may specify the minimal possible window size, or it may send a duplicate ACK, which will cause the sender to drastically reduce its transmission rate. Buffering of incoming packets continues until scatter engine 66 has conveyed an interrupt to CPU 22, and the CPU has accordingly woken up. The buffered packets are then delivered to the appropriate process running on the CPU, at a packet delivery step 88. At this point, acknowledgment generator 68 may also signal senders to increase their transmission rates as desired.

Although the embodiments described above refer mainly to sleep states of CPU 22, the techniques and principles of the present invention may similarly be applied in handling sleep states of other host resources, such as root complex 24 and host memory 26. For example, when NIC 30 receives a packet while both root complex 24 and CPU 22 are in a sleep state and the NIC buffers are filled, NIC 30 can send an RNR NAK to the packet source in order to stop further transmission. When root complex 24 reawakens, NIC 30 may send an out-of-sequence NAK to the packet source in order to induce retransmission until available buffer space in memory 26 is filled. At this point, NIC 30 may again stop transmission (typically with another RNR NAK) until CPU 22 is awake. When the CPU 22 awakens, NIC 30 sends an interrupt to the CPU. Once the CPU has posted new receive resources (i.e., additional buffer space in memory 26 for use by NIC 30), the NIC sends another out-of-sequence NAK to the packet source to induce further retransmission.

In this context, the overall buffer space that is available to NIC 30 depends upon the sleep state of root complex 24 and memory 26. When the root complex and memory are sleeping, NIC 30 is typically limited to its own, dedicated memory in order to buffer data. When the root complex and memory are awake, NIC 30 may extend its buffer space, as described above, to use parts of memory 26. The term "buffer," as used in the present description, should be understood accordingly.

When root complex 24 and host memory 26 are awake, and CPU 22 posted buffers in memory 26 for use by NIC 30 before the CPU went to sleep, the NIC may request transmission from the packet source of a number of packets (or equivalently, a quantity of data) corresponding to the number of available buffers, i.e., to the amount of buffer space that has been allocated to the NIC. For example, the out-of-sequence NAK that is mentioned above may be configured and timed appropriate for this purpose. Thus, assuming CPU 22 posted a certain number of work queue elements (WQEs), each pointing to a buffer, before going to sleep, NIC 30 can request exactly that number of packets. As noted above, this sort of exact transmission request can be triggered by wakeup of the memory and root complex while the CPU remains asleep.

Although some of the embodiments described above relate specifically to the use of NAK packets (and particularly RNR NAK) to control packet transmission over reliable connections, NIC 30 may alternatively use other sorts of messages to defer transmission when CPU 22 and other host resources are in a sleep state. For example, NIC 30 may send a congestion notification packet (CNP), such as a backward explicit congestion notification (BECN), to the transmitting data source, which will cause the data source to drastically reduce its transmission rate.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing data, comprising:
receiving in a peripheral device, which is connected by a bus to a host processor having host resources, a notification of a sleep state of at least one of the host resources;
noting in the peripheral device the host resources that are in a sleep state;
receiving data in the peripheral device from a data source, over a packet network, for delivery to the host processor;
determining in the peripheral device whether the data received over the packet network from the data source is directed to a host resource noted to be in the sleep state; and
responsively to determining in the peripheral device that the received data received over the packet network from the data source is directed to a host resource noted to be in the sleep state, sending, over the packet network, a message generated by the peripheral device, to the data source, which message includes a response parameter that causes the data source to reduce a rate of conveying further data to the peripheral device until the at least one of the host resources has awakened from the sleep state.

2. The method according to claim 1, wherein the peripheral device comprises a network interface controller (NIC), which couples the host processor to the packet network, and wherein receiving the data comprises receiving at the NIC a data packet transmitted over the packet network.

3. The method according to claim 2, wherein sending the message comprises sending, responsively to the notification of the sleep state and the received data, a negative acknowledgment (NAK) generated by the peripheral device over the packet network to the data source, which instructs the data source to retransmit the data packet.

4. The method according to claim 3, wherein receiving the notification comprises receiving an indication of a projected sleep period of the host processor, and wherein sending the NAK comprises instructing the data source, by an instruction sent over the packet network, to retransmit the data packet at a conclusion of the sleep period.

5. The method according to claim 2, and comprising, when the at least one of the host resource awakens from the sleep state, sending a notification, over the packet network, from the NIC to the data source, which instructs the data source to retransmit the data packet.

6. The method according to claim 5, wherein the at least one of the host resources comprises a host memory, in which the host processor, before entering the sleep state, posted buffers to which the NIC is to write the data, and
wherein sending the notification comprises, when the host memory awakens while the host processor remains in the sleep state, requesting transmission from the data source of a quantity of the data corresponding to a volume of the posted buffers.

7. The method according to claim 2, wherein sending the message comprises sending a congestion notification packet to the data source.

8. The method according to claim 2, wherein determining whether the data received over the packet network from the data source is directed to a host resource noted to be in the sleep state comprises determining based on a header of the received data packet.

9. The method according to claim 8, wherein determining whether the data received over the packet network from the data source is directed to a host resource noted to be in the sleep state comprises determining a queue pair (QP) to which the received data packet belongs, based on the header of the received data packet.

10. The method according to claim 1, and comprising, in response to receiving the data, conveying an interrupt from the peripheral device in order to wake the host processor from the sleep state.

11. The method according to claim 10, wherein receiving the notification comprises receiving an indication of a projected sleep period of the host processor, and wherein conveying the interrupt comprises delaying conveyance of the interrupt until a conclusion of the sleep period.

12. The method according to claim 10, wherein conveying the interrupt comprises conveying the interrupt immediately upon receiving the data, in parallel to sending, over the packet network, a message from the peripheral device to the data source, which causes the data source to defer conveying further data.

13. The method according to claim 1, wherein the host resources comprise a host memory, in which in which the host processor, before entering the sleep state, posted buffers to which the peripheral device is to write the data, and
wherein sending the message comprises, when the host memory is awake while the host processor remains in the sleep state, requesting transmission from the data source of a quantity of the data corresponding to a volume of the posted buffers.

14. The method according to claim 1, wherein sending the message comprises sending over the packet network responsively to the notification of the sleep state and the received data, a message indicating a time period for which data should not be transmitted to the host processor.

15. The method according to claim 1, wherein sending the message comprises-sending over the packet network responsively to the notification of the sleep state and the received data, a message indicating a maximal quantity of data.

16. The method according to claim 1, wherein sending the message over the packet network comprises sending the message over an Ethernet or Infiniband packet network.

17. The method according to claim 1, wherein sending the message comprises sending a Transmission Control Protocol (TCP) message.

18. The method according to claim 17, wherein sending the message comprises sending a duplicate ACK.

19. The method according to claim 1, wherein sending the message comprises sending a message indicating a minimal transport protocol window size.

20. Apparatus for processing data, comprising:
a host interface, which is configured to be connected by a bus to a host processor having multiple host resources;
a network interface, which is configured to transmit and receive data over a packet network; and
packet processing circuitry, which is coupled between the host interface and the network interface, and is configured to receive, via the host interface, a notification of a sleep state of at least one of the host resources, and to note the host resources that are in the sleep state, to receive data from a data source via the network interface for delivery to the host processor, to determine whether the data received over the packet network from the data source is directed to a host resource noted to be in the sleep state, and responsively to determining that the received data received over the packet network from the data source is directed to a host resource noted to be in the sleep state, to generate and send a message to the data source over the packet network, which message includes a response parameter that causes the data source to reduce a rate of conveying further data to the apparatus until the at least one of the host resources has awakened from the sleep state.

21. The apparatus according to claim 20, wherein the message sent to the data source comprises a negative acknowledgment (NAK) packet, which is transmitted over the packet network to the data source, responsively to the notification of the sleep state and the received data, and instructs the data source to retransmit the data packet.

22. The apparatus according to claim 21, wherein the notification comprises an indication of a projected sleep period of the host processor, and wherein the NAK packet instructs the data source to retransmit the data packet at a conclusion of the sleep period.

23. The apparatus according to claim 20, wherein the packet processing circuitry is configured to send a notification over the packet network to the data source when the at least one of the host resources awakens from the sleep state, wherein the notification instructs the data source to retransmit the data packet.

24. The apparatus according to claim 23, wherein the at least one of the host resources comprises a host memory, in which the host processor, before entering the sleep state, posted buffers to which the packet processing circuitry is to write the data, and wherein the notification is sent when the host memory awakens while the host processor remains in the sleep state, and requests transmission from the data source of a quantity of the data corresponding to a volume of the posted buffers.

25. The apparatus according to claim 20, wherein the message sent to the data source comprises a congestion notification packet.

26. The apparatus according to claim 20, wherein the packet processing circuitry is configured, in response to receiving the data, to convey an interrupt to the host processor in order to wake the host processor from the sleep state.

27. The apparatus according to claim 26, wherein the notification from the host processor comprises an indication of a projected sleep period of the host processor, and wherein the packet processing circuitry is configured to delay conveyance of the interrupt until a conclusion of the sleep period.

* * * * *